Patented Aug. 6, 1946

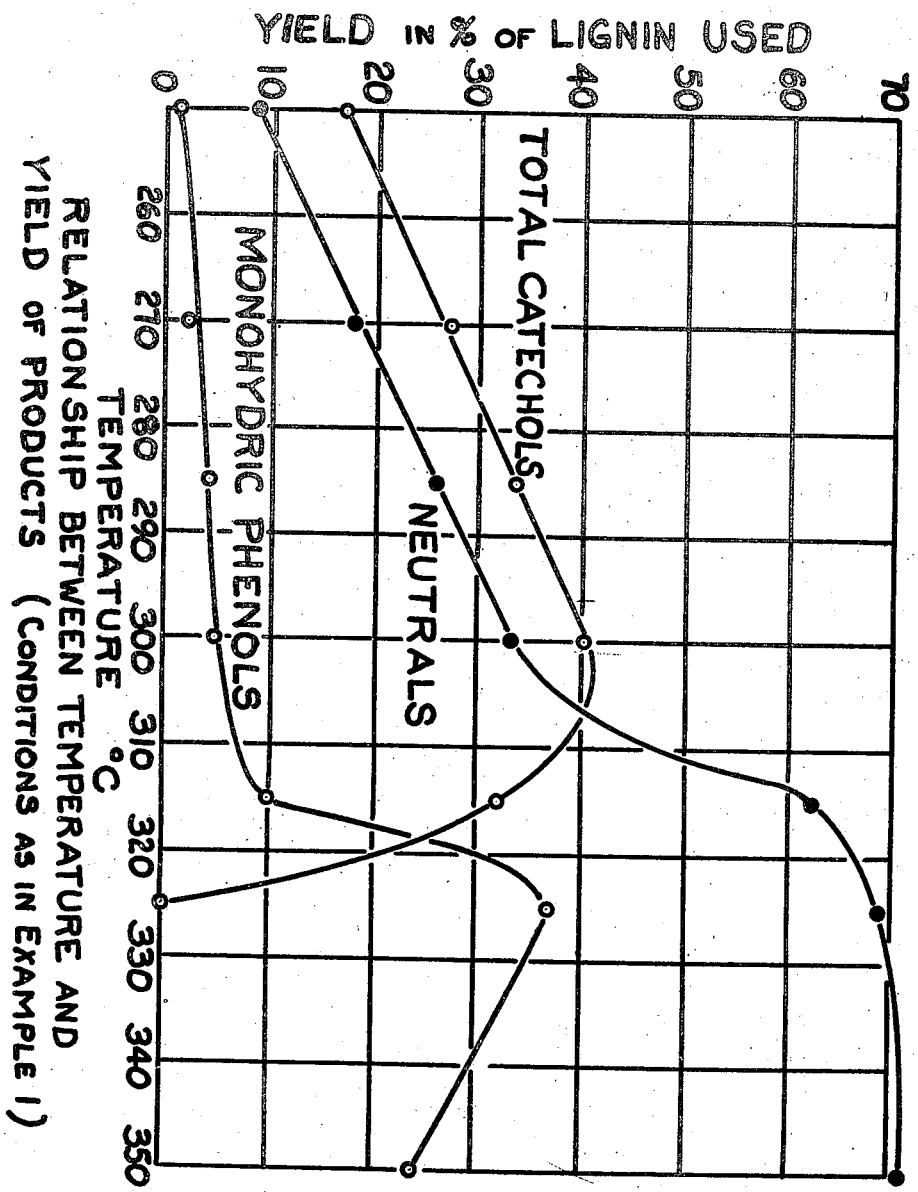

2,405,450

UNITED STATES PATENT OFFICE 2,405,450

PROCESS FOR MAKING LOW MOLECULAR WEIGHT LIGNIN DEGRADATION PRODUCTS

Jörgen Richter Salvesen, Ralph L. Hossfeld, and Robert J. Lovin, Wausau, Wis., assignors to Marathon Corporation, a corporation of Wisconsin Application February 1, 1944, Serial No. 520,668

15 Claims. (Cl. 260—124)

This invention relates to a method for making low molecular weight degration products of lignin. More specifically this invention relates to making lignin degradation products consisting of mono and di-hydric phenols as well as certain neutral compounds.

It is known that lignin compounds when subjected to heat treatment at temperatures in the range of 100° to 200° C. in the presence of caustic alkali solutions are split to form in part simple phenolic compounds such as vanillin, guaiacol and aceto-vanillone. It is further known that when such heat treatment of lignin compounds in caustic alkali solution is carried out at around 250° C. or above, de-methylation takes place and the reaction products are largely phenols of the catechol type. The latter process has, however, never gained practical importance because the yield of low molecular weight, distillable catechols obtained by such cooks with aqueous caustic alkali has been low.

It is known that phenolic and hydro-aromatic degradation products are obtained when lignin is treated in alkaline solution under pressure with molecular hydrogen in presence of a catalyst. When the molecular hydrogen is used without a cataylst lower yields and higher molecular weights compounds are obtained. The presence of hydrogen during alkaline digestion of lignin apparently results in increased yields of low molecular weight lignin degradation products. However, practical execution of such methods are difficult and costly.

Dumas and Stas have indicated (Ann. 35, 139, 1840) that the lower aliphatic alcohols mixed with aqueous caustic soda generate hydrogen when heated in closed vessel at elevated temperature. Schematically the reaction is as follows:

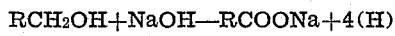
$$RCH_2OH + NaOH \longrightarrow RCOONa + 4(H)$$

Hydrogen thus formed is released in nascent form which is highly reactive. We have found that when lignin substances are treated in aqueous alkaline solutions (i. e. solutions of caustic soda and/or sodium carbonate) to form low molecular weight degradation products consisting of simple organic compounds, the medium in which the compounds are formed is not favorable for producing satisfactory yields, and that undesirable products are also formed. We have discovered after considerable experimentation that by carrying out the previously noted Dumas and Stas reaction simultaneously with the aqueous alkaline degradation treatment of the lignin substances by utilizing the alkali present in the treating liquor the nascent hydrogen formed in the reaction mixture leads to the production of surprisingly greater yields of organic compounds than has ever been possible heretofore.

An important feature of our invention thus resides in utilizing the reducing effects of nascent hydrogen concomitantly generated in the alkaline lignin degradation reaction mixture to stabilize the low molecular simple organic compounds simultaneously formed from the lignin substance. Furthermore, we have discovered that the type of degradation products derived from such reaction mixture can be controlled by regulating the temperature and time of digestion, as will be disclosed hereinafter. Finally, our process has many practical advantages, i. e. it can be carried out by simple continuous digestion of the starting materials.

We are aware that Suida and Prey (Ber. 74, 1916, 1941), German Patent No. 709,943 (1939) describe a process for treating lignin at around 300° C. in closed vessel with calcium hydroxide and "mono-alcohol water mixtures" to give liquid products that are predominantly monohydric phenols or phenol carboxylic acids. Such treatment relates solely to the use of lime, the use of sodium hydroxide being indicated as undesirable in giving "entirely different results." The previously noted Dumas reaction thus does not come into play in such treatment in the manner utilized in our invention. We have found through our experimental study that lime has no desirable properties in the reactions involved in our invention. Our invention is thus based exclusively on the use of alkali metal hydroxides and carbonates, such as sodium hydroxide and/or sodium carbonate, as the agents for establishing and maintaining the proper alkaline and reducing conditions required during the process, and the use of aliphatic primary alcohols which are partially or completely immiscible with water at room temperature, such as the butanols and the pentanols. These alcohols are advantageous for our process also because they greatly facilitate the subsequent isolation of the resulting lignin degradation products, as described below.

Our invention can be practiced with various available lignin substances such as lignosulphonates, partly desulphonated lignosulphonates (such as those disclosed in U. S. patents Nos. 2,057,117, October 13, 1936, and 2,104,701, January 4, 1938), soda lignin, Kraft liquor lignin (thiolignin) acid lignin (from wood hydrolysis with dil. $H_2SO_4$, the so-called Scholler lignin) and sawdust from spruce wood (containing 27% lignin). Our tests have shown that all these lignin substances will give good yields of lignin degradation products in our process. The choice of lignin substances for the process is therefore a question of practical and technical considerations, availability, and cost.

A certain part of the alcohol added to the digestion mixture in our process is converted to the corresponding acid, hydrogen and higher alcohol. The alcohol thus consumed by these reactions increases in linear proportion with the cooking temperature. The amount of alcohol added prior to the digestion should be more than the alcohol converted by the operating temperature used. With these considerations as guidance we use an amount of alcohol corresponding to from 25 to 75% of the volume of the aqueous alkaline lignin solution or dispersion.

The amount of alkali required for the digestion in the form of caustic soda and/or sodium carbonate depends on the character of the lignin substance used and of the temperature of the digestion. We have found that optimum results are obtained when the pH of the digested reaction mixture is not substantially below 10.

We have found that a cooking time of one to two hours is sufficient to obtain good yields of the desired product, although a longer or shorter cooking time, that is, from about ½ to about 6 hours is also useful in obtaining significant yields.

We have found under the above conditions of time, alkalinity and alcohol concentration that not only the quantity, but also the chemical nature of the low molecular weight lignin degradation products will vary depending on the digestion temperature employed. Thus we can produce either dihydric phenols, monohydric phenols or neutral compounds depending on the conditions which we employ. This means of controlling the type of end products in our processes is an important feature of our invention. The yields and variation of different products obtained at the different digesting temperatures in which it is practical to operate are illustrated in the annexed drawing wherein curves are plotted from the following table of experimental findings:

| Max. temp. maintained for 2 hours, °C. | Yield of products in percent of lignin used | | |
|---|---|---|---|
| | Total catechols | Total monohydric phenols | Total neutral oils |
| 250 | 16.75 | 1.06 | 8.3 |
| 270 | 27.2 | 2.12 | 17.7 |
| 285 | 33.6 | 4.18 | 26.0 |
| 300 | 40.4 | 5.18 | 33.3 |
| 315 | 31.9 | 9.9 | 62.5 |
| 325 | 0.0 | 36.9 | 68.8 |
| 350 | 0.0 | 23.8 | 71.2 |

NOTE.—These results were obtained with same lignin caustic alcohol digesting mixture and procedure as described in Example 1 given below.

*Example 1*

Basic calcium lignin sulphonate as obtained according to U. S. Patent Reissue 18,268, December 1, 1931, is mixed with caustic soda and the mixture is subjected to a pressure cook at time and temperature suitable to give maximum yield of vanillin as disclosed in Patent No. 2,057,117, October 13, 1936. The vanillin in this liquor is extracted on the alkaline side according to U. S. Patent No. 2,104,701, January 4, 1938. The resulting extracted solution contains partially desulphonated lignin sulphonic acid compounds and caustic soda.

600 cc. of this extracted solution, containing 107 grams partially desulphonated lignin sulphonic acid compounds and about 60 grams NaOH is mixed with 400 cc. butanol saturated with water (designated as "wet butanol") and the mixture is heated in a pressure vessel with agitation to 300° C. and maintained at such temperature for two hours. The cooled digestion mixture is poured into an aqueous solution of sulphuric acid of sufficient strength to give a pH 1-2 of the final mixture. On standing this mixture separates into two layers. The upper layer containing the lignin degradation products, is separated and combined with butanol washings of the aqueous layer. This butanol solution of the lignin degration products may be treated in known ways to obtain the various fractions it contains. It has been found most suitable to first neutralize its acidity by shaking with an aqueous suspension of calcium carbonate, then to distill off essentially all the butanol, then to pour the residue in a fine steam into large excess of an aliphatic hydrocarbon solvent with vigorous stirring. By such procedure a flocculent precipitate of partially degraded but amorphous and non-distillable lignin substance separate and the low molecular weight distillable lignin degradation products remain dissolved in the solvent from which they may be individually segregated in known ways.

The yields by weight obtained were as follows:

| | Per cent based on the lignin used |
|---|---|
| Catechols | 41.0 |
| Monohydric phenols | 4.7 |
| Neutral oils | 29.0 |

Of the total phenolic compounds 54% were distillable low molecular weight compounds.

*Example 2*

600 cc. of the same starting material of the extracted solution as described in Example 1 together with 400 cc. wet butanol were heated in a pressure vessel with agitation to 270° C. and maintained at such temperature for two hours. Reaction mixture was treated as in Example 1 and yielded by weight:

| | Per cent based on the lignin used |
|---|---|
| Catechols | 26.9 |
| Monohydric phenols | 7.0 |
| Neutral oils | 15.9 |

Of the total phenolic compounds, 59% by weight were distillable low molecular weight compounds, consisting in part of guaiacol, methylguaiacol (creosol), pyrocatechol and other nuclear substituted phenols.

*Example 3*

A solution was made by dissolving basic calcium lignin sulphonate, such as is obtained according to the procedure of U. S. Patent Re. 18,268, December 1, 1931, in an aqueous solution of sodium hydroxide. 600 cc. of such solution containing 123 grams lignin and 60 grams NaOH were mixed with 400 cc. wet butanol and heated in a pressure vessel with agitation to 300° C. and maintained at such temperature for two hours. The reaction mixture after being worked up as described in Example 1 gave by weight the following yields:

| | Per cent based on the lignin used |
|---|---|
| Catechols | 33.4 |
| Monohydric phenols | 7.3 |
| Neutral oils | 26.9 |

Example 4

600 cc. of the lignin soda solution described in Example 1 were mixed with 400 cc. wet butanol and heated in a pressure vessel with agitation to 300° C. and maintained at such temperature for 30 minutes. The reaction mixture, worked up as in Example 1, gave by weight:

| | Per cent based on the lignin used |
|---|---|
| Catechols | 33.5 |
| Monohydric phenols | 4.7 |
| Neutral oils | 14.6 |

Example 5

120 grams dry "Scholler lignin" (residue from hydrolysis of wood with dilute sulphuric acid) containing 70.5 grams pure lignin was suspended in 600 cc. of an aqueous solution of 60 grams sodium hydroxide. This suspension together with 400 cc. wet butanol was heated with agitation to 300° C. in a pressure vessel and maintained at this temperature for two hours. The resulting reaction mixture was worked up as in Example 1, except that after removing the flocculated precipitate of amorphous lignin degradation product, the aliphatic hydrocarbon was removed by distillation and the residue distilled under vacuum. From the distillate was obtained catechols in a yield corresponding to 18.7% by weight based on the pure lignin in the starting material.

Example 6

The lignin caustic soda starting material resulting from extraction of vanillin, as described in Example 1, was treated with carbon dioxide or flue-gas according to U. S. Patent 2,371,136 March 13, 1945, filed July 12, 1943, to lower the pH to around 10.8 and remove all calcium in form of $CaCO_3$ by filtration. Prior to treatment with $CO_2$ the solids content of the solution is adjusted to between 20 and 28% by weight. The solution is then heated at a temperature about 65° C. with $CO_2$ gas while the pH is reduced within a range between 10.7 and 11.0 to precipitate calcium carbonate in filterable form and practically free of organic matter. In the lime-free filtrate, the uncombined sodium is present substantially as $Na_2CO_3$. 600 cc. of such solution containing lignin substances and sodium carbonate was mixed with 400 cc. wet butanol and subjected to same pressure cook and working up procedure as described in Example 5. There was obtained a yield of distillable catechols corresponding to 22.1% by weight of the lignin used.

The above described examples are given as illustrations of various typical applications for our invention. It should be understood that numerous other variations and modifications are possible within the scope and principles of the invention herein disclosed.

We claim:

1. A process for making low molecular weight simple distillable organic compounds from lignin substances which comprises treating a lignin substance with a mixture of water, sodium alkaline solution, and a water-immiscible lower primary aliphatic alcohol at 270° to 350° C.

2. A process for making low molecular weight simple distillable organic compounds from lignin substances which comprises treating a lignin substance with a mixture of water, sodium alkaline solution, and a partially water-immiscible lower primary aliphatic alcohol in amount 25 to 75% of the volume of the total mixture at 270° to 350° C., and recovering the low molecular weight compounds from the reaction mixture.

3. A process for making low molecular weight simple distillable organic compounds from lignin substances which comprises treating a lignin substance with a mixture of water, sodium alkaline solution, and butanol at 270° to 350° C., and recovering the low molecular weight compounds from the reaction mixture.

4. A process for making low molecular weight simple distillable organic compounds from lignin substances which comprises treating a lignin substance with a mixture of water, sodium alkaline solution, and a partially water-immiscible lower primary aliphatic alcohol at 270° to 350° C. for a period of about 1 to 2 hours, and recovering the low molecular weight compounds from the reaction mixture.

5. A process for making low molecular weight simple distillable organic compounds from lignin substances which comprises treating a lignin substance with a mixture of water, sodium alkaline solution, and a partially water-immiscible lower primary aliphatic alcohol at a temperature range from 270° to 300° C. to produce organic compounds predominantly of the catechol type, and recovering the low molecular weight compounds from the reaction mixture.

6. A process for making low molecular weight simple distillable organic compounds from lignin substances which comprises treating a lignin substance with a mixture of water, sodium alkaline solution, and a partially water-immiscible lower primary aliphatic alcohol at a temperature range from 300° to 325° C. to produce organic compounds consisting of monohydric phenols, and neutral compounds and recovering the low molecular weight compounds from the reaction mixture.

7. A process for making low molecular weight simple distillable organic compounds from lignin substances which comprises treating a lignin substance with a mixture of water, sodium alkaline solution, and a partially water-immiscible lower primary aliphatic alcohol within the temperature range of 325° to 350° C. to produce organic compounds consisting of monohydric phenols, and neutral compounds, with the complete exclusion of catechols, and recovering the low molecular weight compounds from the reaction mixture.

8. A process for making low molecular weight simple distillable organic compounds from lignin substances which comprises treating partially desulphonated lignin sulphonic acid compounds with a mixture of water, sodium alkaline solution and a partially water-immiscible lower primary aliphatic alcohol at elevated temperatures, and recovering the low molecular weight compounds from the reaction mixture.

9. A process for making low molecular weight simple distillable organic compounds from lignin substances which comprises treating a basic calcium lignin sulphonic acid compound with a mixture of water, sodium alkaline solution, and a partially water-immiscible lower primary aliphatic alcohol at elevated temperatures, and recovering the low molecular weight compounds from the reaction mixture.

10. A process for making low molecular weight simple distillable organic compounds from lignin substances which comprises treating Scholler lignin with a mixture of water, sodium alkaline solution, and a partially water-immiscible lower primary aliphatic alcohol at elevated temperatures, and recovering the low molecular weight compounds from the reaction mixture.

11. A process for consecutively producing a series of low molecular weight simple organic compounds from lignin substances present in the waste liquor derived from the digestion of lignocellulose with bisulphite liquor in producing paper pulp which comprises treating said waste liquor with lime to precipitate basic calcium lignin sulphonic acid compounds, dissolving said precipitated compounds in aqueous caustic soda solution, heating the resulting solution to form vanillin, extracting the vanillin from said solution with butanol, heating the resulting aqueous liquor at elevated temperature with butanol to form low molecular weight lignin degradation products and recovering the low molecular weight organic compounds from the solution.

12. A process for consecutively producing a series of low molecular weight simple organic compounds from lignin substances present in the waste liquor derived from the digestion of lignocellulose with bisulphite liquor in producing paper pulp which comprises treating said waste liquor with lime to precipitate basic calcium lignin sulphonic acid compounds, dissolving said precipitated compounds in aqueous caustic soda solution, heating the resulting solution to form vanillin, extracting the vanillin from said solution with butanol, heating the resulting aqueous liquor with butanol at a temperature range from 270° to 300° C. to form low molecular weight lignin degradation products predominantly of the catechol type, and recovering the low molecular weight organic compounds from the solution.

13. A process for consecutively producing a series of low molecular weight simple organic compounds from lignin substances present in the waste liquor derived from the digestion of lignocellulose with bisulphite liquor in producing paper pulp which comprises treating said waste liquor with lime to precipitate basic calcium lignin sulphonic acid compounds dissolving said precipitated compounds in aqueous caustic soda solution, heating the resulting solution to form vanillin, extracting the vanillin from said solution with butanol, heating the resulting aqueous liquor with butanol at a temperature range from 300° to 325° C. to form low molecular weight lignin degradation products consisting of monohydric phenols, and neutral compounds, and recovering the low molecular weight organic compounds from the solution.

14. A process for consecutively producing a series of low molecular weight simple organic compounds from lignin substances present in the waste liquor derived from the digestion of lignocellulose with bisulphite liquor in producing paper pulp which comprises treating said waste liquor with lime to precipitate basic calcium lignin sulphonic acid compounds, dissolving said precipitated compounds in aqueous caustic soda solution, heating the resulting solution to form vanillin, extracting the vanillin from said solution with butanol, heating the resulting aqueous liquor at a temperature range from 325° to 350° C. with butanol to form low molecular weight lignin degradation products consisting of monohydric phenols, and neutral compounds with complete exclusion of catechols, and recovering the low molecular weight organic compounds from the solution.

15. A process for consecutively producing a series of low molecular weight simple organic compounds from lignin substances present in the waste liquor derived from the digestion of lignocellulose with bisulphite liquor in producing paper pulp which comprises treating said waste liquor with lime to precipitate basic calcium lignin sulphonic acid compounds, dissolving said precipitated compounds in aqueous caustic soda solution, heating the resulting solution to form vanillin, extracting the vanillin from said solution with butanol, treating the extracted solution with carbon dioxide gas until the pH is between 10.7 and 11.0 to precipitate calcium carbonate, filtering out the calcium carbonate, adding butanol to the filtrate, heating the resulting aqueous liquor at elevated temperature to form low molecular weight lignin degradation products, and recovering the low molecular weight organic compounds from the solution.

JÖRGEN RICHTER SALVESEN.
RALPH L. HOSSFELD.
ROBERT J. LOVIN.